United States Patent [19]

Ogura et al.

[11] Patent Number: 4,739,356
[45] Date of Patent: Apr. 19, 1988

[54] ELECTRIC CONNECTOR FOR CAMERA

[75] Inventors: Shigeo Ogura, Tokyo; Masahiro Takei, Kanagawa, both of Japan

[73] Assignee: Canon Kabushiki Kaisha, Tokyo, Japan

[21] Appl. No.: 71,064

[22] Filed: Jul. 8, 1987

[30] Foreign Application Priority Data

Jul. 23, 1986 [JP] Japan ................................ 61-174043

[51] Int. Cl.$^4$ .............................................. G03B 17/12
[52] U.S. Cl. .................................................. 354/286
[58] Field of Search ............................... 354/286, 455

[56] References Cited

U.S. PATENT DOCUMENTS

4,464,034 8/1984 Tomino ................................ 354/286
4,637,704 1/1987 Ishimura et al. ..................... 354/286

Primary Examiner—Michael L. Gellner
Attorney, Agent, or Firm—Fitzpatrick, Cella, Harper & Scinto

[57] ABSTRACT

An electric connector for a camera, the camera having a body and an accessory coupled with each other by their mounts of the mating-to-shift type, and electrically connected to each other by contacting of contact groups on the two mounts with each other when the coupling is complete. Each of the electric contact groups includes at least a contact for ground, a contact for signal and a contact for electrical power. The lengths of all the electric contacts on the accessory device in the coupling-up direction are so determined that, as the shifting of the accessory device in mating with the camera body goes on, the contacts for ground come first to contact with each other, then the contacts for signal to contact with each other and then the contacts for electrical power to contact with each other.

7 Claims, 6 Drawing Sheets

ELECTRIC CONNECTOR FOR CAMERA

BACKGROUND OF THE INVENTION

1. Field of the Invention

This invention relates to an electric connector for electrically connecting a camera body with an accessory device such as interchangeable lens.

2. Description of the Related Art

Recently, as the trend of using electronics in the camera system advances, there are increasing proposals concerning the electric connector device between the camera body and the interchangeable lens through which the informations representing the focal length and the F-number at full open aperture of the interchangeable lens are electrically transmitted to the camera body.

Also, in recent years, electronic cameras usable in actual practice have been developed. For example, one of their types is that a microcomputer is built into the interchangeable lens, and gives and receives data to and from the microcomputer which is built within the camera body through a data connector, so that the diaphragm and the mechanism a focusing system are controlled.

In such a type, there is need to use an additional connector through which electrical power is supplied from the camera body to the interchangeable lens. Hence, in total, at least three common connectors with inclusion of the before-mentioned data connector and a ground connector common to both camera body and lens must be had in between the camera body and the lens.

In application of the conventional connector device to this type of electronic camera, however, if the contact of connector for power supply on the camera body touches any other contacts of connectors than the contact of connector for power reception on the lens in electrical conduction, it is highly possible that the electrical circuit within the interchangeable lens will be destroyed.

To solve this problem there have been previous proposals in U.S. Pat. Nos. 4,492,429 and 4,464,034, for example. According to these proposals, as coupling of the interchangeable lens to the camera body is carried out by rotating them about the optical axis relative to each other, establishment of the power supply to the interchangeable lens is made only when the rotating is complete. In more detail, although the data and ground connectors are allowed to contact with each other in the middle of the course of performing the coupling by rotating the interchangeable lens, it is the power connectors on the camera body and the lens that are brought into contact with each other by means of a lock mechanism for the interchangeable lens at the time of completion of the coupling rotation.

However, these prior known devices have problems that the operative connection between the power connector and the lock mechanism is of complicated structure, and that if a lock release button of the interchangeable lens is unintentionally pushed down, the power supply to the interchangeable lens is cut off at that time. Thus, faulty operations are apt to occur.

According to another proposal made in U.S. Pat. No. 4,637,704, the ground connector is arranged to become effective in retard of the coupling rotation of the interchangeable lens relative to the camera body after the data and power connectors have been effective (at the same time). For this purpose, the practical means is to differentiate the widths of all the connectors from one another, or their separations.

However, if the power and the data connectors have potentials before the ground connector is grounded, a possibility will arise that as the integrated circuit within the interchangeable lens has been latched up, the later connection of the ground connector to the circuit earth destroys the IC.

It is to be noted that U.S. patent application Ser. No. 012,862 filed Feb. 10, 1987 assigned to the assignee of the present invention discloses the electric connectors as associated with the mount device of the camera. In this connection, it should be pointed out that the electric connectors of this preceding patent application are so arranged that their individual contact timings take place almost simultaneously, and, therefore, this arrangement is different from that of the present patent application described below.

SUMMARY OF THE INVENTION

An object of the invention is to provide an electric connector assembly for a camera which enables the electrical circuit such as IC to be prevented from electrical destruction when an accessory device is electrically connected to the camera body by bringing the electric connectors into contact with each other.

DETAILED DESCRIPTION OF THE PREFERRED EMBODIMENT

Figure 1:
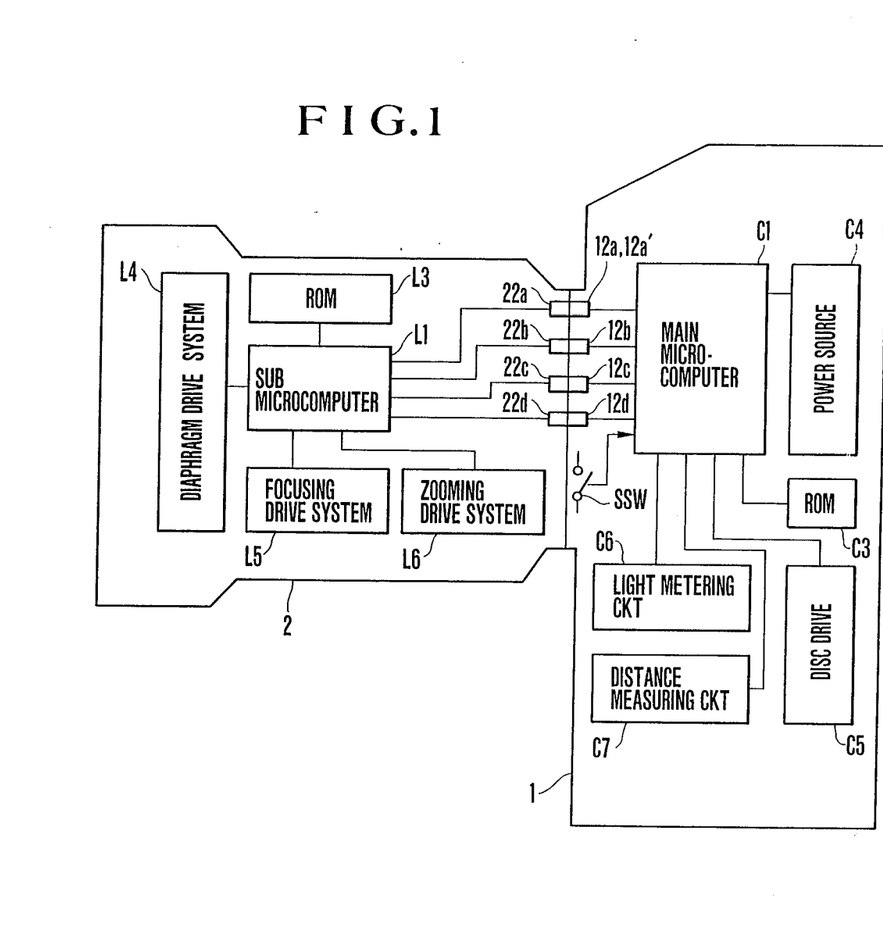
FIG. 1 is a diagram of the system of an electronic camera employing the present invention.

In FIG. 1 there is shown an example of an application of the present invention to the electronic camera. The camera body 1 has five electric contacts or connector contacts 12a, 12a', 12b, 12c and 12d at the terminal ends of first and second ground lines, data and BUSY signal lines and a power line, respectively. The interchangeable lens unit 2 has four electric contacts or connector contacts 22a, 22b, 22c and 22d for ground, data and BUSY signals and electrical power, respectively. When the coupling of the lens unit 2 with the camera body 1 is completed, a switch SSW turns on to produce a detection signal. The operation of the camera in programmed AE mode is described in brief below. When the switch SSW turns on, a main microcomputer C1 renders the power line (12d-22d) operative to supply current to a sub microcomputer L1 which is located in the lens unit 2. In return, the sub microcomputer L1 transmits informations of its own lens representing, for example, the F-number at full open aperture to the main microcomputer C1.

After that, as an object to be photographed is aimed at by the photographer, when the release button is pushed down, the main microcomputer C1 determines the size of aperture opening, the shutter speed and the focusing amount based on the outputs of a light metering circuit C6 and a distance measuring circuit C7. The main microcomputer then transmits information representing the exposure value and the object distance to the sub microcomputer L1 in the lens unit 2 through the signal lines (12b-22b and 12c-22c). The sub microcomputer L1 then commands a diaphragm drive system L4 and a focusing drive system L5 to execute its instructions. When the executing ends, it gives a signal to the main microcomputer C1. Responsive to this signal, the main microcomputer C1 activates the shutter and a disc drive C5 by which video signals are recorded on a disc. Thus, each shot of the camera is terminated.

Figure 2:
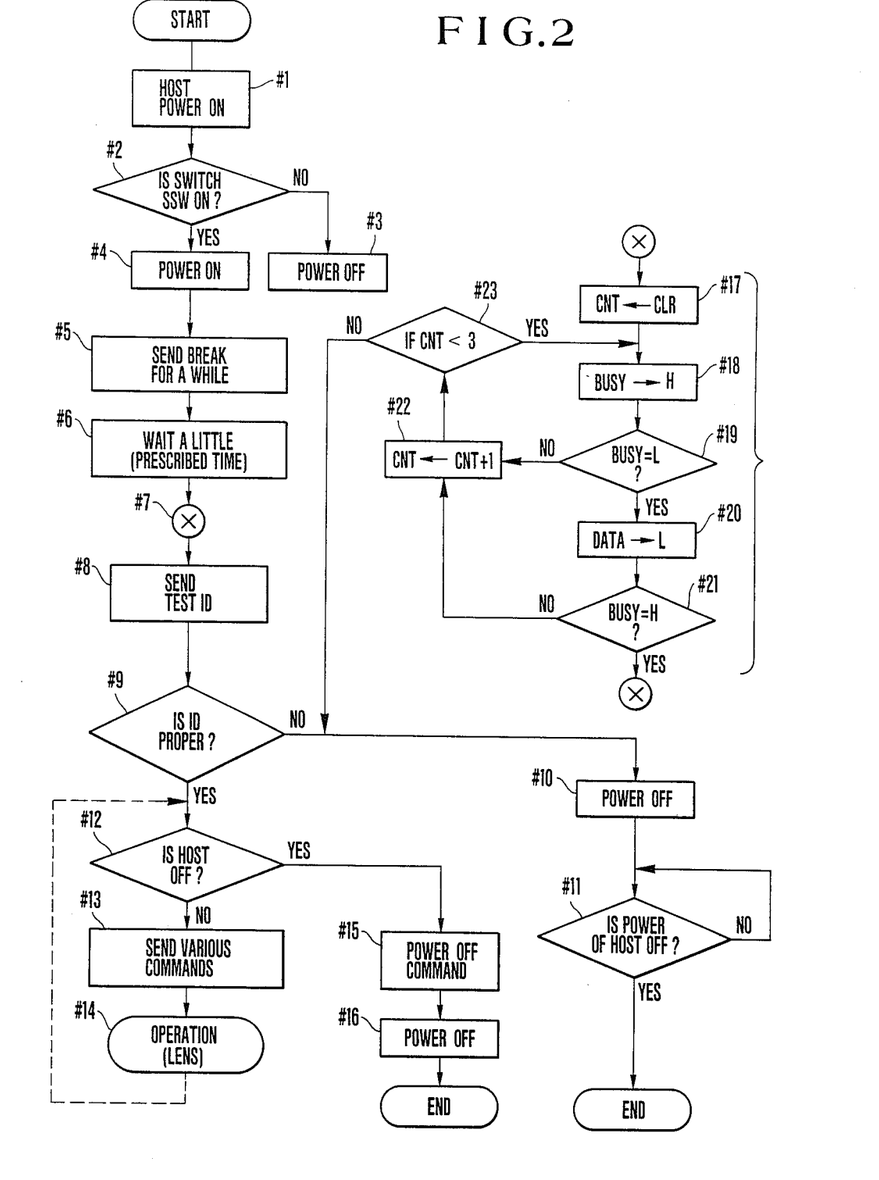
FIG. 2 is a flowchart for the operation of the circuit in the camera body when the lens is attached thereto.

Next, the operation of the main microcomputer C1 is described with reference to the flowchart of FIG. 2. The electrical power supply to the main microcomputer C1 starts in a first step #1.

Then, whether or not the switch SSW is ON is determined in a step #2. If the switch SSW is OFF, the lens unit 2 is hindered from current supply (step #3). Otherwise (for the coupling is complete), a step #4 is executed to effect preliminary supplying of current to the lens unit 2 (to the contact 12d of power connector).

After that, the data line 12b is changed to (broken) and maintained at low level for about 1 msec. in a step #5. Hence, the sub microcomputer L1 is reset automatically. By a step #6, the data line is changed to high level again, initiating initialization of the lens side, and waiting a sufficient time for the termination of this initialization. In the next step #17 which is to be uncounted by a loop #7, the check count is cleared.

By the next step #18, the BUSY line of the main interface is changed to high level. If the sub microcomputer L1 of the lens unit 2 is ready for receiving signals, the BUSY line (12c) becomes low level.

Hence, whether or not the BUSY line 12c is high level is examined in a step #19. If so, the check count is incremented one in a step #22. This results in a check count of "1" since the check counting has started from zero. In the next step #23, whether the counted value is smaller than 3 is tested. If so, then the step #18 is repeated to check the BUSY line 12c. In a case that even after such a procedure of the steps #18, #19, #22 and #23 has been twice recycled, the BUSY line 12c still remains high level, the step #23 transits to a step #10 so that the current supply to the lens unit 2 is cut off. After that, whether or not the electrical power source of the main microcomputer C1 is OFF is examined in a step #11. When it turns off, the execution of the program ends.

It will be appreciated that, in this embodiment, for checking whether or not the sub microcomputer L1 is in such an abnormal state as to be unable to receive data signals from the main microcomputer C1, the checking operation is recycled a plurality of times, thereby preventing an error of the checking operation itself from occurring.

Therefore, the efficiency of production of main and sub microcomputers can be improved.

Now, if, in the step #19, the BUSY line 22c of the sub microcomputer L1 is ready for receiving signals, or the BUSY line 22c is low level, then advance to a step #20. For this time, the data line 12b of the camera body is changed to low level.

In this embodiment, if the condition is normal, it will result that when a prescribed time from the moment at which the main microcomputer C1 started to send data has passed, the BUSY line 22c of the sub microcomputer L1 changes to high level. So, whether or not the BUSY line 22c of the lens unit 2 is high is examined in a step #21. If it is low, then increment the check count again by steps #22 and #23. After three cycles of checking operation with the steps #18 to #23 have been carried out, the flow returns to the steps #10 and #11 as has been described above.

If, in the step #21, the BUSY line of the lens unit 2 is determined to be high, as it implies that the BUSY line 22c is not in trouble such as burn-out, then exit from the loop #7 and enter a step #8.

In the step #8, a command called "TEST ID" is sent to the lens unit 2. The lens unit 2 then responds by giving a signal representing an ID code to be described later. Hence, this ID code is checked in a step #9. If it is improper, the electrical power source is taken away from the sub microcomputer L1 in a step #10.

If the given ID code is proper, then advance to a step #12 to test if the main microcomputer C1 is ON. If not, a command for the diaphragm drive system L4 of the lens unit 2 to return the size of aperture opening to the maximum is sent to the sub microcomputer L1 in a step #15. After that, a step #16 follows to cut off the current supply to the lens unit 2.

If, in the step #12, the electrical power source of the main microcomputer C1 is determined to be on, then advance to a step #13 to send various commands. Thereby, the operations of the various mechanisms within the lens unit 2 are controlled in a step #14. These steps #13 and #14 are continued until the main microcomputer C1 is turned off.

Figure 3:
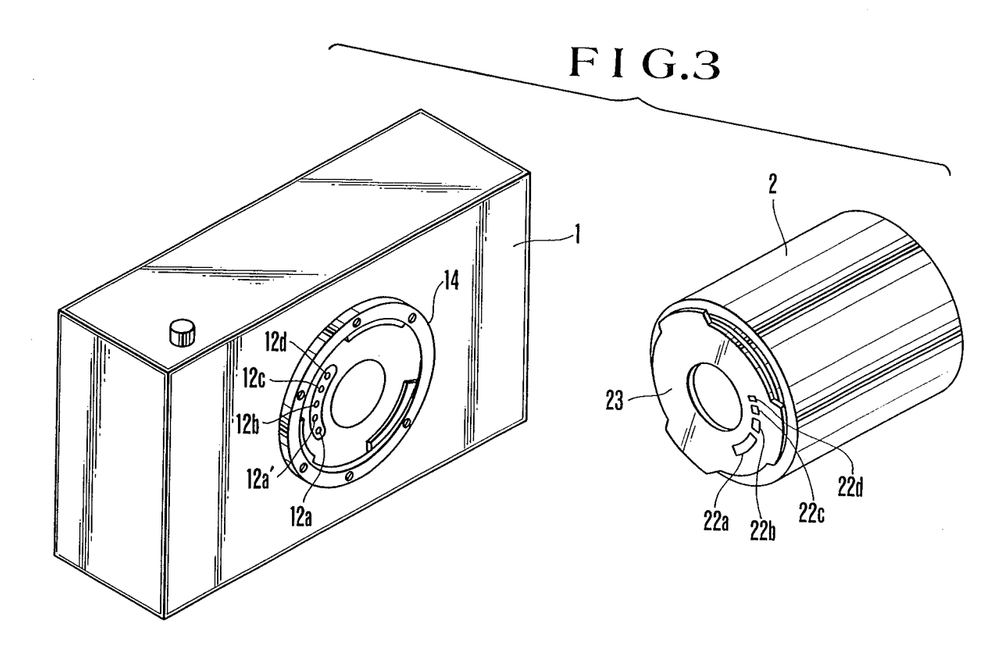
FIG. 3 is a perspective view of an embodiment of an electric connector assembly according to the present invention with the camera body and the lens in separation.

In FIG. 3, the camera body 1 has contacts 12a and 12a' which are grounded and are two in number for the purpose of reducing the interface resistance and of making sure the sufficient electrical connection is established, contacts 12b and 12c for data signal and BUSY signal and a contact 12d for electric power supply. The last contact 12d is positioned farthest (at the most right position viewed in FIG. 4A) from the other contacts on the lens unit 2 than that for electrical power source so that it can contact only with the last.

The interchangeable lens unit 2 has a contact 22a for ground, contacts 22b and 22c for data and BUSY signals, and a contact 22d in correspondence to the respective contacts 12a to 12d on the camera body 1.

Figure 4A:
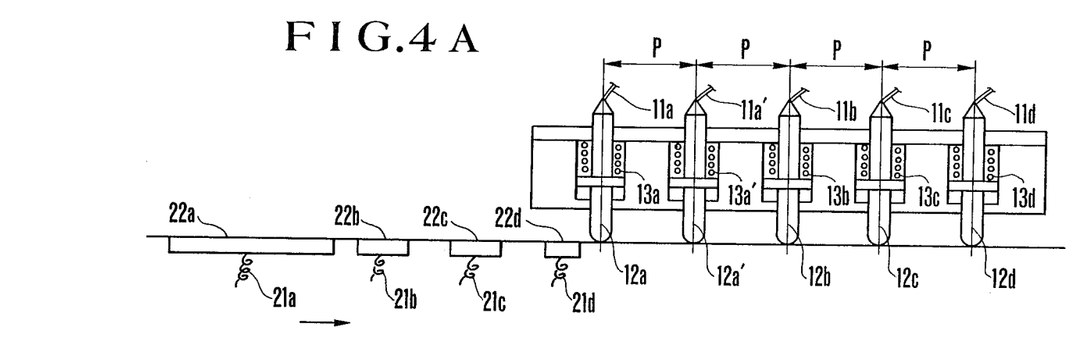
FIGS. 4A to 4F are sectional views illustrating the operation of the electric connector assembly.
Figure 4B:
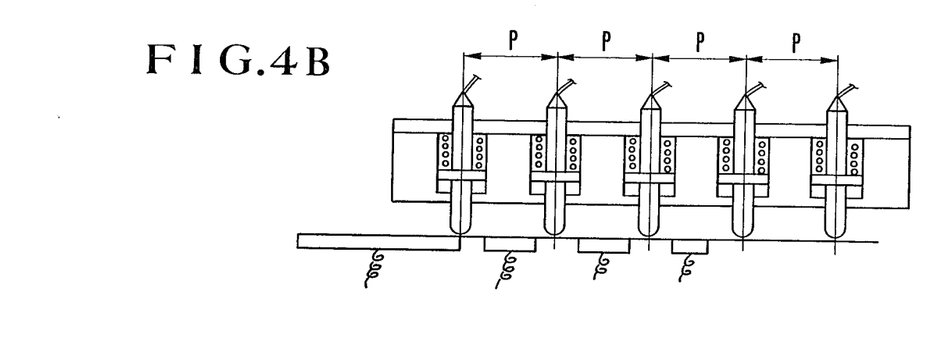
Figure 4C:
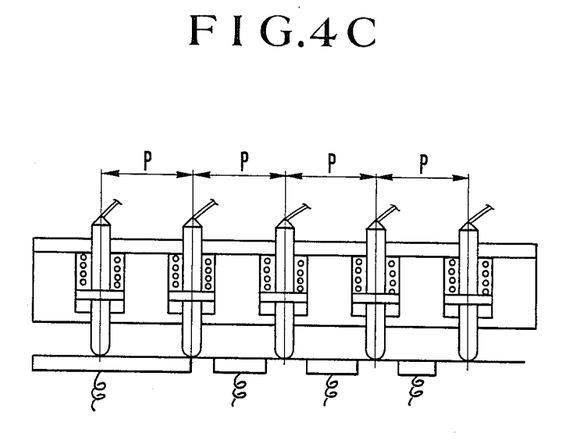
Figure 4D:
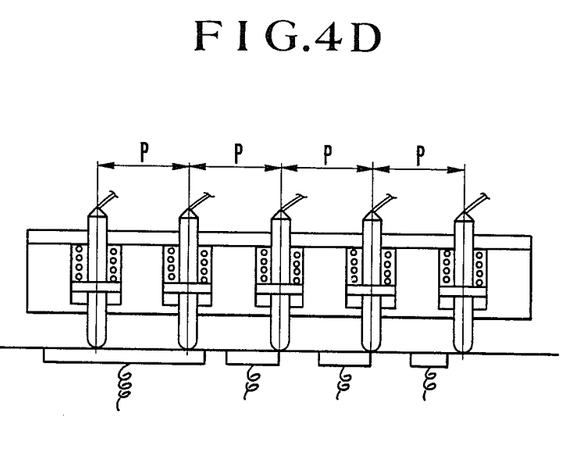
Figure 4E:
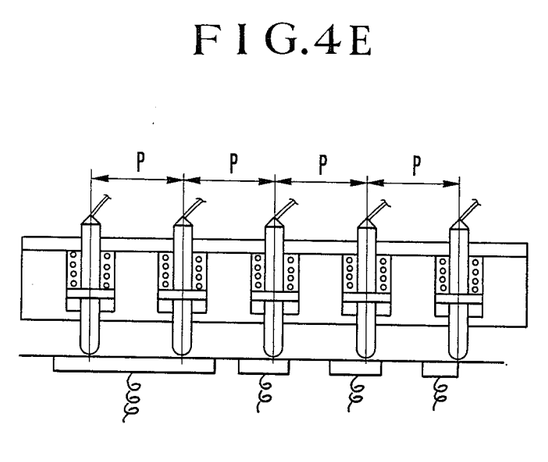

FIG. 4A in sectional view illustrates the connector contacts on both the camera body 1 and the lens unit 2. The contacts 12a to 12d on the camera body 1 are arrayed in evenly spaced relation by a pitch P, and the opposite ends of the connector contacts 12a to 12d are soldered directly to respective lead wires 11a to 11d. Springs 13a to 13d urge the respective contacts 12a to 12b toward the lens. The opposite ends of the lead wires 11a to 11d are connected to the main microcomputer C1 of FIG. 1.

Figure 4F:
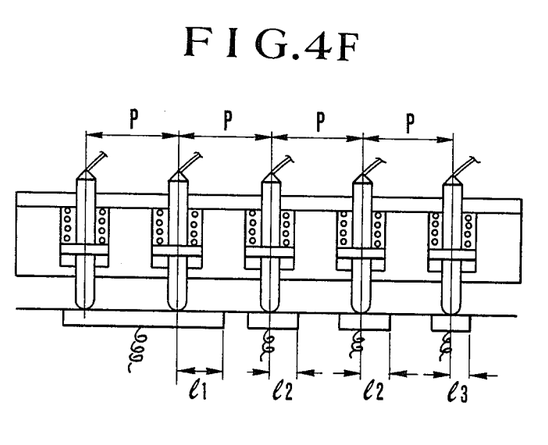

The contacts 22a to 22d on the lens unit 2 have respective lead wires 21a to 21d which terminate at an interface in the lens unit 2. In FIG. 4A, the contacts of the camera body 1 and lens unit 2 are not in contact with each other. As the coupling goes on, the contacts on the lens unit 2 move (actually rotate) in a direction indicated by the arrow. FIG. 4F shows a coupling-completed position. In this figure, the lengths of the slidable surfaces of the contacts 22a, 22b (22c) and 22d of the lens unit 2 are predetermined as $l_1 > l_2 > l_3$.

Next, by reference to FIGS. 4A to 4F, the coupling operation is described with inclusion of intermediate steps. As the contacts 22a to 22d on the lens unit 2 move from the position of FIG. 4A in the direction of the arrow, what first occurs is that the contact 22a for ground on the lens unit 2 contacts with the first contact 12a for ground on the camera body 1 in a position of FIG. 4B. Upon further movement to a position of FIG. 4C, in addition to the first contact 12a, the contact 22a on the lens unit 2 comes to contact with the second contact 12a' for ground on the camera body 1. Then, in a position of FIG. 4D, the contacts 22b and 22c for signals on the lens unit 2 come to contact with the contacts 12b and 12c for signals on the camera body 1. And, what occurs last is that the contact 22d for electrical power on the lens unit 2 comes to contact with the contact 12d for electrical power on the camera body 1. At the terminal position of FIG. 4F, the coupling of the lens with the camera body is completed.

When such a rule of design or $l_1 > l_2 > l_3$ is set forth, the electrical connections are established successively in the order of ground, signal and electrical power when coupling is being performed, and the contact for electrical power on the camera body does not contact with the other contacts than the one for electrical power on the lens unit. Therefore, the damage of the electrical circuit within the lens unit which would otherwise be caused by accidental touching of it with the contacts for signals on the lens unit can be avoided, and the main microcomputer in the camera body is free from errors in testing. Further, it becomes possible to assure prevention of the IC from being destroyed by the latching up.

Though, in the above-described embodiment, the ground is connected through the contact, this may be varied such that the contacts for ground are omitted and instead the ground lines in the camera body and lens unit are connected to their couplers 14 and 23, respectively. Even in this case, because these couplers come first of all to contact with each other, one of the features of the invention, the order in which the electrical connections for ground, signal and power are established successively is not violated. For this case, because no use is made of the two contacts 12a and 12a' on the camera body and the one contact 22a on the lens unit, the production cost is remarkably reduced.

For note, though the foregoing embodiment has been described in connection with the interchangeable lens unit 2, the advantages of the invention can be retained even when applied to other types of camera systems using an intermediate tube (an accessory for elongating the total length of the lens), or an intermediate adapter (for altering the focal length of the lens, or introducing a soft focus effect into the lens, or changing the focusing operation from the visual to the automatic mode).

For note, in the illustrated embodiment of the invention, the coupling of the camera body with the accessory device is carried out by rotating them about the optical axis relative to each other. But, the invention is not confined thereto, and is applicable to another camera whose coupling means is of the sliding type. Even in this case, the advantages of the invention can be obtained.

As has been described above, according to the invention, the electric contacts through which the accessory device is electrically connected to the camera body when they are coupled with each other are so constructed and so arranged that the electric contacts in each pair come to contact with each other in the order of ground→signal→electrical power. This makes it possible to provide an electric connector which enables the electrical circuits such as ICs to be protected against damages.

For note, in the above-described embodiment, use is made of a switch SSW for detection arranged to be actuated when the coupling of the interchangeable lens unit 2 is completed, and whose output representing the completion of the coupling controls the supply of the electrical power to the contact for electrical power on the camera body. This implies that the safety measure is doubled.

For note, so long as the features of the invention are fulfilled, either the omission of the above-described switch SSW for detection, or a change of the timing of production of the detection signal of the switch SSW to before the completion of the coupling does not lead to any problem.

What is claimed is:

1. An electric connector for a camera in which the camera body and an accessory device are coupled with each other by their mounts of a mating-to-shift type, and when the coupling is completed, electrical signals are transmitted between them by contacting of electric contact groups arranged at portions of said two mounts with each other, comprising:
    said electric contact groups each having at least a contact for ground, a contact for signal, and a contact for electrical power; and
    said contacts each having a predetermined length in the shifting direction in such a manner that when said accessory device is shifted for mating with said camera body, said electric contacts for ground of said contact groups come first to contact with each other, then said electric contacts for signal to contact with each other, and then said electric contacts for electrical power to contact with each other.

2. An electric connector according to claim 1, wherein as said accessory device an interchangeable lens having an optical axis and a built-in microcomputer is used.

3. An electric connector according to claim 2, wherein said shifting of said interchangeable lens in mating with said camera body is performed by relative rotation about the optical axis.

4. An electric connector according to claim 1, wherein said camera body is provided with a detection switch for detecting a coupling state at a time when the shifting of said accessory device in mating with said camera body is almost complete, and with a control circuit responsive to the detection output of said switch which represents the coupling state for supplying electrical power to said contact for electrical power on said camera body.

5. An electric connector for an accessory device, said device having a mount to be coupled with a mount on a camera body, in which electrical signals are transmitted between said device and said camera body by contacting of electric contact groups arranged at portions of said two mounts with each other when the coupling is complete, comprising:
    said electric contact groups each having at least a contact for ground, a contact for signal and a contact for electrical power; wherein
    the lengths in the coupling-up direction of all said electric contacts being so determined that when said accessory device is being coupled with said camera body, said contact for ground comes first to contact, then said contact for signal to contact and then said contact for electrical power to contact.

6. An electric connector according to claim 5, wherein as said accessory device an interchangeable lens having an optical axis and a built-in microcomputer is used.

7. An electric connector according to claim 6, wherein said shifting of said interchangeable lens in mating with said camera body is performed by relative rotation about the optical axis.

* * * * *

UNITED STATES PATENT AND TRADEMARK OFFICE
CERTIFICATE OF CORRECTION

PATENT NO. : 4,739,356
DATED : April 19, 1988
INVENTOR(S) : OGURA, ET AL.

It is certified that error appears in the above-identified patent and that said Letters Patent is hereby corrected as shown below:

COLUMN 1

Line 24, "mechanism a" should read --mechanism of a--.

COLUMN 3

Line 59, "Now, if," should read --Now, if --.

COLUMN 4

Line 52, "12b" should read --12d--.

Signed and Sealed this

Twentieth Day of September, 1988

Attest:

DONALD J. QUIGG

Attesting Officer  Commissioner of Patents and Trademarks